United States Patent Office 3,426,090
Patented Feb. 4, 1969

3,426,090
HYDROGENATION OF AN AROMATIC COMPOUND WITH A CATALYST CONTAINING A GROUP VIII METAL AND A SUBFLUORIDE
Norman A. Fishel, Lansing, Mich., assignor to Universal Oil Products Company, Des Plaines, Ill., a corporation of Delaware
No Drawing. Filed Oct. 10, 1966, Ser. No. 585,306
U.S. Cl. 260—667             9 Claims
Int. Cl. C07c 5/10

ABSTRACT OF THE DISCLOSURE

An aromatic compound, such as a benzene hydrocarbon, is hydrogenated at a temperature of 10°–425° C. and a pressure of 1–200 atmospheres in contact with a catalyst comprising a refractory inorganic oxide containing a Group VIII metal and which has been chemically combined with a subfluoride vapor such as aluminum monofluoride or silicon difluoride.

---

This invention relates to a conversion process for the hydrogenation of an aromatic compound into more useful compounds. More specifically, this invention is concerned with a conversion process for the hydrogenation of an aromatic compound utilizing a novel catalyst comprising a refractory inorganic oxide containing at least one metal from Group VIII of the Periodic Table chemically combined with a metal subfluoride vapor.

It is an object of this invention to provide a process for the hydrogenation of aromatic compounds utilizing a novel hydrogenation catalyst.

A specific object of this invention is to provide a novel method and a novel catalyst for hydrogenating aromatic compounds to provide the desired hydrogenated product in high yields without the inducing of other decomposition reactions.

One embodiment of the invention relates to a conversion process which comprises hydrogenating an aromatic compound at a temperature in the range of from about 10° to about 425° C. and a pressure in the range of from about atmospheric to about 200 atmospheres in contact with a catalyst comprising a refractory inorganic oxide containing at least one metal from Group VIII of the Periodic Table chemically combined with a metal subfluoride vapor.

Other objects and embodiments referring to alternative aromatic compounds and to alternative catalytic compositions of matter will be found in the following further detailed description of the invention.

The process of my invention is applicable to the hydrogenation of aromatic compounds including, for example, benzene, toluene, ortho-xylene, meta-xylene, para-xylene, ethylbenzene, ortho-ethyltoluene, meta-ethyltoluene, para-ethyltoluene, 1,2,3 - trimethylbenzene, 1,2,4 - trimethylbenzene, 1,3,5-trimethylbenzene, diethylbenzene, triethylbenzene, normal propylbenzene, isopropylbenzene, etc. and mixtures thereof. Preferred hydrogenatable aromatic compounds are the monocyclic aromatic hydrocarbons, that is, the benzene hydrocarbons. Higher molecular weight alkyl aromatic hydrocarbons are also suitable. These include those aromatic hydrocarbons such as are produced by the alkylation of aromatic hydrocarbons with olefin polymers and are used as intermediates in the preparation of sulfonate surface-active agents. Such products are freqeuntly referred to in the art as alkylate, and include hexylbenzenes, nonylbezenes, dodecylbenzenes, pentadecylbenzenes, hexyltoluenes, nonyltoluenes, dodecyltoluenes, pentadecyltoluenes, etc. Very often, alkylate is obtained as a high boiling fraction in which the alkyl group attached to the aromatic nucleus varies in size from about $C_9$ to $C_{18}$. Other suitable aromatic hydrocarbons, which at specified conditions, depending upon the melting point of the aromatic chosen, would be in liquid form, would include those aromatic hydrocarbons with two or more aryl groups such as diphenyl, diphenylmethane, triphenyl, triphenylmethane, fluorene, stilbene, etc. Examples of other aromatic hydrocarbons utilizable within the scope of this invention which at specified hydrogenation conditions, depending upon melting point of the aromatic chosen, would be in liquid form, include those containing condensed aromatic rings. These include naphthalene, alkyl naphthalenes, anthracene, phenanthrene, naphthacene, rubrene, etc. Of the above-mentioned aromatic hydrocarbons that could be utilized in the process of this invention, the benzene hydrocarbons are preferred, and of the preferred benzene hydrocarbons, benzene itself is particularly preferred.

As hereinbefore set forth, the invention is concerned with a conversion process for the hydrogenation of aromatic compounds, said process being effected in the presence of a catalyst which possesses a high degree of hydrocarbon conversion activity and is particularly effective as a hydrogenation catalyst for the aromatic compounds hereinabove set forth. The catalyst comprises a refractory inorganic oxide containing at least one metal from Group VIII of the Periodic Table chemically combined with a metal subfluoride vapor. Satisfactory refractory oxides for the preparation of catalysts for use in the process of this invention include high surface area crystalline alumina modifications such as gamma-, eta- and theta-alumina, although these are not necessarily of equivalent suitability. By the term high surface area is meant a surface area measured by surface adsorption techniques within the range of from about 25 to about 500 or more square meters per gram and preferably a surface area of approximately 100 to 300 square meters per gram. In addition to the aforementioned gamma-, eta- and theta-aluminas which may be utilized as solid supports, it is also contemplated that other refractory oxides, containing at least one metal from Group VIII of the Periodic Table, such as silica, zirconia, magnesia, thoria, etc., and combinations of refractory oxides containing at least one metal from Group VIII of the Periodic Table such as silica-alumina, silica-magnesia, alumina-silica-magnesia, alumina-thoria, alumina-zirconia, etc., may also be utilized as solid supports for the catalyst of the present invention.

As set forth hereinabove, the catalyst comprises a refractory inorganic oxide containing at least one metal from Group VIII of the Periodic Table that is combined with a metal subfluoride vapor to effect chemical combination of the refractory inorganic oxide with said metal subfluoride vapor.

Typical metals from Group VIII of the Periodic Table for use in the present invention include platinum, palladium, ruthenium, rhodium, osmium, and iridium and mixtures thereof. Platinum and palladium are particularly preferred. The Group VIII component of my novel catalyst for use in the present invention will normally be utilized in an amount of from about 0.01 percent to about 2 percent by weight.

Particularly preferred metal subfluorides include the aluminum subfluorides including aluminum monofluoride and silicon subfluorides including silicon difluoride due mainly to the relative ease in preparing these compounds although the invention is not restricted to their use, but may employ any of the known metal subfluorides insofar as they are adaptable. However, it is not intended to infer that different metal subfluorides which may be employed will produce catalysts which have identical effects upon any given organic reaction as each of the catalysts produced from different metal subfluorides and by slightly varying procedures will exert its own characteristic action.

It is a feature of the present invention that the finished catalyst of the present invention prepared as hereinafter set forth has increased structural strength and a high degree of stability due to the immobility of the components of the finished catalyst inasmuch as chemical combination of the refractory inorganic oxide containing at least one metal from Group VIII of the Periodic Table with the metal subfluoride vapor is accomplished as hereinafter described.

The catalyst of the present invention comprises a metal subfluoride vapor chemically combined with the refractory inorganic oxide containing at least one metal from Group VIII of the Periodic Table so as to effect chemical combination of the refractory inorganic oxide with the metal subfluoride vapor, and as hereinbefore set forth, it is the particular association of these components which results in the unusual catalytic properties of this catalyst. The metal subfluoride vapor may be chemically combined with the refractory inorganic oxide containing at least one metal from Group VIII of the Periodic Table at temperatures in the range of 650° C. to about 1200° C. and at a pressure of from about subatmospheric to about 7 atmospheres. The formation of the metal subfluoride vapor, and especially the formation of anhydrous aluminum monofluoride is accomplished by sweeping with a gas such as helium, argon or hydrogen, and preferably helium, a stoichiometric mixture of aluminum metal (melting point about 660° C.) and aluminum trifluoride (melting point greater than 1000° C.) which is heated to about 750 to 800° C. The refractory inorganic oxide containing at least one metal from Group VIII of the Periodic Table which is then chemically combined with the anhydrous aluminum monofluoride is placed in the downstream helium flow. The chemical combination takes place at temperatures in excess of 650° C. Fluoride concentrations of between 0.01 percent to about 5 percent (by weight) are preferred.

In an alternative method, the catalyst may be prepared by pelleting a mixture of aluminum powder with a stoichiometric excess of aluminum trifluoride, and mixing these pellets with the refractory inorganic oxide containing at least one metal from Group VIII of the Periodic Table catalyst support and then heating in vacuum in a furnace tube at elevated temperatures.

The process of this invention utilizing the catalyst hereinbefore set forth may be effected in any suitable manner and may comprise either a batch or a continuous type operation. The preferred method by which the process of this invention may be effected is a continuous type operation. One particular method is the fixed bed operation in which the aromatic compound is continuously charged to a reaction zone containing a fixed bed of the desired catalyst, said zone being maintained at the proper operating conditions of temperature and pressure, that is, a temperature in the range of from about 10° to about 425° C. or more, and preferably from 50° to about 375° C., and a pressure including a pressure of from about atmospheric to about 200 atmospheres or more. The catalyst is suitable for either gas phase or liquid phase reactions so that the liquid hourly space velocity (the volume of charge per volume of catalyst per hour) may be maintained in the reaction zone in the range of from about 0.1 to about 20 or more, preferably in the range of from about 0.1 to about 10, or at a gaseous hourly space velocity in the range of from about 100 to about 3000 or more. The reaction zone may comprise an unpacked vessel or coil or may be lined with an adsorbent packing material. The charge passes through the catalyst bed in either an upward or downward flow and the hydrogenated product is continuously withdrawn, separated from the reactor effluent, and recovered, while any unreacted starting materials may be recycled to form a portion of the feed stock. It is also contemplated within the scope of this invention that reaction gases such as helium, hydrogen, nitrogen, argon, etc., may also be charged to the reaction zone if desired. Another continuous type operation comprises the moving bed type in which the aromatic compound and the catalyst bed move either concurrently or countercurrently to each other while passing through said reaction zone.

Still another type of operation which may be used is the batch type operation in which a quantity of the aromatic compound and the catalyst are placed in an appropriate apparatus such as, for example, a rotating or stirred autoclave. The apparatus is then heated to the desired temperature and maintained thereat for a predetermined residence time at the end of which time the flask and contents thereof are cooled to room temperature and the desired reaction product is recovered by conventional means, such as, for example, by washing, drying, fractional distillation, crystallization, etc.

The following examples are given to illustrate the process of the present invention which, however, are not intended to limit the generally broad scope of the present invention in strict accordance therewith.

EXAMPLE I

A quartz vessel with provisions for connection to a vacuum system was filled with a mixture of about 50 grams of $\frac{1}{16}$ inch alumina spheres containing 0.75 percent (by weight) platinum and about 10 grams of $\frac{1}{8}$ inch pellets comprising about 20% aluminum metal and about 80% aluminum trifluoride by weight. The contents of the vessel are outgassed at a pressure of less than $10^{-4}$ mm. while slowly being heated in a tube furnace. Approximately 4 hours were allowed for the system to reach 600 to about 650° C. The evacuated vessel was then sealed off. The vessel was then placed in a muffle furnace at 750° C. for 1 hour and rotated slowly to aid mixing.

The sealed vessel was cooled to room temperature. After cooling, the vessel was opened in a helium dry box, the catalyst spheres were separated from the pellets and the catalyst was then placed in vessels which were then sealed. A fluoride level of about 3.1 weight percent was achieved. This catalyst was designated as catalyst A.

EXAMPLE II

In this example, a volatile fluoride (800° C.) was prepared by sweeping with helium a stoichiometric mixture of aluminum metal (melting point 660° C.) and aluminum trifluoride (melting point greater than 1000° C.) which was heated to 750–800° C. Anhydrous aluminum monofluoride was then produced. A catalyst base in the form of $\frac{1}{16}$ inch alumina spheres containing 0.375 percent (by weight( platinum was then placed in the downstream helium flow and the anhydrous aluminum monofluoride was chemically combined with the alumina base at a temperature in excess of 650° C.

The catalyst produced by this vapor deposition and chemical combination of the aluminum monofluoride with the alumina had a fluoride level of about 3.2 percent by weight of fluoride chemically combined therewith. This catalyst was designated as catalyst B.

EXAMPLE III

The catalyst designated as catalyst A prepared according to Example I above was utilized in a hydrogenation reaction, the finished catalyst being placed in an appropriate continuous hydrogenation apparatus. In the experiment, benzene along with hydrogen was charged to the hydrogenation zone. The reactor was maintained at about 15 p.s.i.g. and 294° C. Approximately 70% of the benzene was converted to cyclohexane and methylcyclopentane obtained as was evidenced by gas-liquid chromatography.

EXAMPLE IV

A second portion of the catalyst prepared according to Example I and designated as catalyst A is again utilized in an appropriate continuous hydrogenation apparatus. In the experiment, a fresh batch of the finished catalyst is placed in the hydrogenation reaction zone and toluene along with hydrogen is charged to said reaction zone. The reactor is maintained at about 100 p.s.i.g. and about 310° C. Substantial conversion of the toluene to methylcyclohexane is obtained as is evidenced by gas-liquid chromatography.

EXAMPLE V

The catalyst prepared according to Example II and designated as catalyst B is utilized in an appropriate continuous hydrogenation apparatus to determine the hydrogenation activity of said catalyst. In the experiment, the catalyst is placed in the hydrogenation reaction zone and benzene and hydrogen are charged to said reaction zone. The reactor is maintained at about 50 p.s.i.g. and a temperature of about 300° C. Gas-liquid chromatographic analyses of the product stream indicate that substantial conversion occurs with the major products being cyclohexane and methylcyclopentane.

EXAMPLE VI

The catalyst prepared according to Example I and designated as catalyst A was utilized in the hydrogenation apparatus. In the experiment, a fresh batch of finished catalyst was placed in the hydrogenation reaction zone and ethylbenzene and hydrogen are charged thereto. The reactor is maintained at about 150 p.s.i.g. and about 330° C. Substantial conversion of the ethylbenzene to ethylcyclohexane is obtained as is evidenced by gas-liquid chromatography.

I claim as my invention:

1. A conversion process which comprises hydrogenating an aromatic compound at a temperature of from about 10° C. to about 425° C. and a pressure in the range of from about atmospheric to about 200 atmospheres in contact with a catalyst comprising a refractory inorganic oxide containing at least one metal from Group VIII of the Periodic Table and which has been chemically combined with a fluoride selected from the group consisting of aluminum subfluoride vapor and silicon subfluoride vapor.

2. The process of claim 1 further characterized in that said fluoride is aluminum monofluoride.

3. The process of claim 2 further characterized in that said refractory inorganic oxide comprises alumina.

4. The process of claim 2 further characterized in that said refractory inorganic oxide comprises silica-alumina.

5. The process of claim 2 further characterized in that said Group VIII metal is platinum.

6. The process of claim 5 further characterized in that said aromatic compound is a benzene hydrocarbon.

7. The process of claim 6 further characterized in that said benzene hydrocarbon is benzene.

8. The process of claim 6 further characterized in that said benzene hydrocarbon is toluene.

9. The process of claim 6 further characterized in that said benzene hydrocarbon is ethylbenzene.

References Cited

UNITED STATES PATENTS 2,898,387   8/1959   Teter _____ 260—667

FOREIGN PATENTS 904,732   8/1962   Great Britain.

DELBERT E. GANTZ, *Primary Examiner.*

G. J. CRASANAKIS, *Assistant Examiner.*